US00RE50716E

(19) United States
(12) Reissued Patent
Lee et al.

(10) Patent Number: US RE50,716 E
(45) Date of Reissued Patent: *Dec. 30, 2025

(54) WASHING MACHINE

(71) Applicant: Samsung Electronics Co., Ltd., Suwon-si (KR)

(72) Inventors: Do Yun Lee, Yongin-si (KR); Sang Wook Kim, Suwon-si (KR)

(73) Assignee: Samsung Electronics Co., Ltd., Suwon-si (KR)

( * ) Notice: This patent is subject to a terminal disclaimer.

(21) Appl. No.: 18/213,772

(22) Filed: Jun. 23, 2023

Related U.S. Patent Documents

Reissue of:
(64) Patent No.: 9,725,841
Issued: Aug. 8, 2017
Appl. No.: 14/959,583
Filed: Dec. 4, 2015

U.S. Applications:
(63) Continuation of application No. 17/216,456, filed on Mar. 29, 2021, now Pat. No. Re. 49,611, which is an
(Continued)

(30) Foreign Application Priority Data

Dec. 4, 2014 (KR) ..... 10-2014-0173203

(51) Int. Cl.
*D06F 34/20* (2020.01)
*D06F 37/42* (2006.01)
(Continued)

(52) U.S. Cl.
CPC ..... *D06F 34/20* (2020.02); *D06F 37/42* (2013.01); *D06F 39/14* (2013.01); *D06F 2103/40* (2020.02)

(58) Field of Classification Search
CPC .... F01L 13/0047; Y02T 10/142; D06F 37/42; D06F 39/14; D06F 37/28; Y10S 292/69; E05B 65/00
See application file for complete search history.

(56) References Cited

U.S. PATENT DOCUMENTS 4,763,937 A * 8/1988 Sittnick, Jr. ..... E05B 65/108 361/170
5,100,186 A * 3/1992 Nordvall ..... E05B 47/0046 292/144
(Continued)

FOREIGN PATENT DOCUMENTS

JP 2010-094250 A 4/2010
JP 4905433 B2 3/2012
(Continued)

OTHER PUBLICATIONS

Notice of Preliminary Rejection dated Nov. 20, 2020 in connection with Korean Application No. 10-2014-0173203, 13 pages.
(Continued)

*Primary Examiner* — Terrence R Till

(57) ABSTRACT

A washing machine including a cabinet with an opening, a door that opens and closes to uncover and cover the opening, respectively, and a door locking device that selectively restrains a motion of the door when the door is closed. This configuration may be used to prevent the door from opening when, for example, the washing machine is in operation. In addition, a structure of a front portion of the opening may facilitate loading and unloading of laundry.

12 Claims, 15 Drawing Sheets

Related U.S. Application Data application for the reissue of Pat. No. 9,725,841, and a continuation of application No. 16/192,555, filed on Nov. 15, 2018, now Pat. No. Re. 48,487, which is an application for the reissue of Pat. No. 9,725,841.

(51) Int. Cl.
*D06F 39/14* (2006.01)
*D06F 103/40* (2020.01)

(56) References Cited

U.S. PATENT DOCUMENTS

| | | | | |
|---|---|---|---|---|
| 6,363,755 | B1 * | 4/2002 | Hapke | D06F 37/42 210/146 |
| 7,251,961 | B2 * | 8/2007 | Hapke | D06F 39/14 68/12.26 |
| 9,725,841 | B2 | 8/2017 | Lee et al. | |
| 2004/0111916 | A1 * | 6/2004 | Hwang | D06F 39/14 34/601 |
| 2012/0312594 | A1 * | 12/2012 | Hapke | D06F 37/42 174/668 |
| 2014/0102149 | A1 | 4/2014 | Park et al. | |
| 2015/0000195 | A1 | 1/2015 | Choi et al. | |
| 2015/0008808 | A1 * | 1/2015 | Kim | D06F 39/14 312/228 |
| 2015/0069889 | A1 * | 3/2015 | Kim | D06F 39/14 312/228.1 |
| 2015/0123521 | A1 * | 5/2015 | Lee | D06F 39/14 312/228 |
| 2015/0240527 | A1 * | 8/2015 | Osvatic | D06F 37/42 292/144 |
| 2016/0230326 | A1 * | 8/2016 | Han | D06F 39/14 |
| 2016/0251793 | A1 * | 9/2016 | Finney | D06F 37/28 |

FOREIGN PATENT DOCUMENTS

| | | | |
|---|---|---|---|
| KR | 10-2011-0013149 | A | 2/2011 |
| KR | 10-2012-0056702 | A | 6/2012 |
| KR | 10-1583348 | B1 | 1/2016 |
| KR | 10-2014-0173203 | A | 6/2016 |
| KR | 10-1779158 | B1 | 9/2017 |
| KR | 10-1940245 | B1 | 1/2019 |
| KR | 10-1940244 | B1 | 4/2019 |

OTHER PUBLICATIONS

Notice of Patent Allowance dated May 23, 2021, in connection with Korean Application No. 10-2014-0173203, 3 pages.
Notice of Preliminary Rejection dated Dec. 12, 2021, in connection with Korean Application No. 10-2021-0111230, 7 pages.
Notice of Preliminary Rejection dated Nov. 28, 2023, in connection with Korean Application No. 10-2023-0148959, 11 pages.
Notice of Preliminary Rejection dated May 27, 2023, in connection with Korean Application No. 10-2022-0122741, 7 pages.

* cited by examiner

FIG. 6
Amended
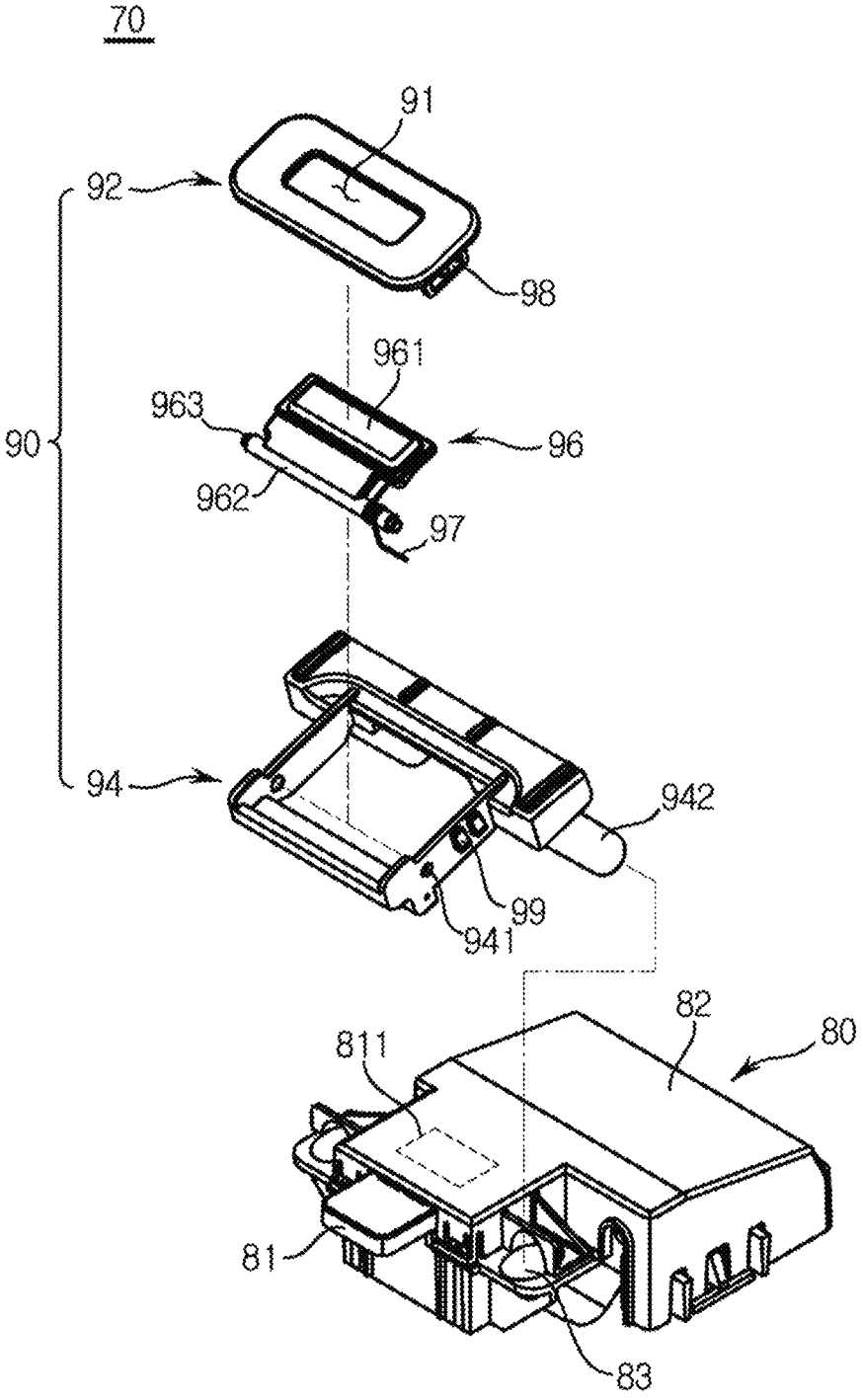

WASHING MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[RELATED APPLICATION(S)] *CROSS-REFERENCE TO RELATED APPLICATIONS*

*Notice: More than one reissue application has been filed for the reissue of U.S. Pat. No. 9,725,841 (the '841 Patent). The reissue applications are the present application, U.S. Reissue patent application Ser. No. 17/216,456 filed Mar. 29, 2021 (the '456 Application), and U.S. Reissue patent application Ser. No. 16/192,555 filed Nov. 15, 2018 (now U.S. Reissue Pat. No. RE48,487) (the '487 Patent).* This application *is a reissue continuation of the '456 Application, which is a reissue continuation of the '487 Patent, which is a reissue of the '841 Patent, which* claims [the benefit of] *priority to* Korean Patent Application No. 10-2014-0173203, filed on Dec. 4, 2014 in the Korean Intellectual Property Office, the [disclosure] *disclosures* of which [is] *are* incorporated herein by reference.

BACKGROUND

The present disclosure relates to a washing machine, and more particularly, to a washing machine with a door locking device.

Generally, a washing machine is an apparatus that uses water and detergent to wash laundry, and includes a cabinet, a fixed tub in which wash water is stored, and a rotating tub rotatably provided in the fixed tub.

An opening is formed at the washing machine for loading and unloading laundry, and the opening is covered or uncovered with a door. A locking device may be provided to prevent the door from opening during, for example, washing operation.

However, when the locking device of the door is disposed at a front surface of the door, a cabinet corresponding thereto has a protruding structure, which interferes with a user when the user bends down to load or unload laundry.

Since a door locking device may restrain a door from outside the washing machine cabinet, a part of the door locking device installed in the cabinet to be coupled to a locking part of the door had to protrude to the outside via a through-hole in the cabinet. Hence, it may have been difficult not to be able to form a flat opening flange to receive the door on an upper surface of the cabinet. Furthermore, when the door locking device is disposed at a center of a front portion of the opening flange, the door locking device that may protrude past an abutting surface may bother a user when the user bends over to load or unload laundry, or otherwise access the washing machine tub.

SUMMARY

An aspect of the present disclosure provides a washing machine with an improved structure of a door locking device. In addition, a washing machine with an improved structure of an upper frame of a cabinet is provided to facilitate an approach to an inner portion of the washing machine to, for example, load or unload laundry.

According to an aspect of the present disclosure, a washing machine includes a cabinet, an upper frame at an upper portion of the cabinet and having an opening and an opening flange formed around the opening. A door is rotatably disposed at the upper frame to open and close, where a closed door covers the opening and an opened door uncovers the opening. A locking member is provided at the door where the locking member is configured to be inserted into the upper frame when the door is closed. A door locking device may be supported by the upper frame and configured to selectively restrain the locking member in the upper frame when the door is closed.

The locking member may be provided at a center portion of a front portion of the door, and the door locking device may be at a corresponding center portion of a front portion of the upper frame.

The opening flange may include a through-hole and a mounting part around the through-hole. The door locking device may comprise a locking switch configured to restrain the locking member and a mounting unit where a first side is coupled to the mounting part and a second side is coupled to the locking switch.

The mounting unit may include an upper unit above the mounting part and have an accommodation hole configured to correspond to the through-hole, where the accommodation hole may be capable of receiving the locking member. The mounting unit may also include a lower unit below the mounting part.

The upper unit and the lower unit may be configured to be coupled to the opening flange with the mounting part in between, and the locking switch may be coupled to the lower unit and mounted on a lower portion of the opening flange by coupling between the upper unit and the lower unit.

One of the upper unit and the lower unit may include a locking protrusion, and the other of the upper unit and the lower unit may include a coupling hole that couples to the locking protrusion.

The mounting unit may include a flip cover that uncovers and covers the accommodation hole.

The mounting unit may include a closing member configured to force the flip cover upward to cover the accommodation hole, where the flip cover is configured to be pushed open by the locking member as the door is closed.

In an embodiment of the present disclosure, the flip cover and the closing member may be a part of the lower unit.

In an embodiment of the present disclosure, the upper unit and the lower unit may be coupled to the opening flange while having the mounting part therebetween, the locking switch may be coupled to the lower unit, the lower unit may include a coupling flange to be coupled to the upper frame, and the coupling flange may be fixed in the upper frame by screw coupling and a hook structure to mount the locking switch on the lower portion of the opening flange.

The locking switch may include a sliding member configured to be selectively inserted into the locking member, and the sliding member may slide in the upper frame.

In an embodiment of the present disclosure, the mounting unit may include a coupling flange for coupling to the upper frame, and the coupling flange may be welded to an inside of the upper frame.

In an embodiment of the present disclosure, the opening flange may include a front flange in front of the opening, a pair of side flanges formed at sides of the opening and facing each other, and a rear flange provided at a rear of the opening facing the front flange, and connected to the pair of side flanges, and the door locking device at a center portion of the front flange.

The front flange may include a front inclined surface that is inclined down toward the front of the upper frame, a rear inclined surface that is inclined down toward the opening, and a door seating part between the front inclined surface and the rear inclined surface where a forward portion of the door may be seated on the door seating frame when the door is closed.

An angle between the front inclined surface and a reference ground surface may be smaller than an angle between the side flanges and the reference ground surface.

The front inclined surface, the rear inclined surface, and the door seating part may be formed as one curved surface.

The opening flange may be formed to be gradually sloped downward from the rear toward the front.

At the opening flange, a height from a reference ground surface to an upper portion of the front flange may be less than a height from the reference ground surface to upper portions of the side flanges.

According to an aspect of the present disclosure, a washing machine includes a cabinet, an upper frame at an upper portion of the cabinet having an opening and an opening flange formed around the opening, and a door rotatably disposed at the upper frame to open and close, where a closed door covers the opening and an opened door uncovers the opening. The door may have a locking member that may be inserted into the upper frame when the door is closed, and a door locking device supported by the upper frame, and configured to selectively restrain the locking member in the upper frame when the door is closed. The door locking device may include a locking switch configured to restrain the locking member, an upper unit above the opening flange and having an accommodation hole capable of accommodating the locking member, and a lower unit below the opening flange having one side coupled to the upper unit and the other side coupled to the locking switch.

One of the upper unit and the lower unit may include a locking protrusion, and the other of the upper unit and the lower unit may include a coupling hole that couples to the locking protrusion.

The locking switch may include a sliding member that may be selectively inserted into the locking member, and the sliding member may slide in the upper frame.

The upper unit may include a flip cover that may be configured to cover and uncover the accommodation hole.

The upper unit may include a closing member configured to force the flip cover upward to cover the accommodation hole, where the flip cover is configured to be pushed open by the locking member as the door is closed.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is an exploded perspective view of the door locking device of the washing machine according to an embodiment of the present disclosure;

DETAILED DESCRIPTION

Hereinafter, embodiments according to the present disclosure will be described in detail with reference to the accompanying drawings.

Figure 1:
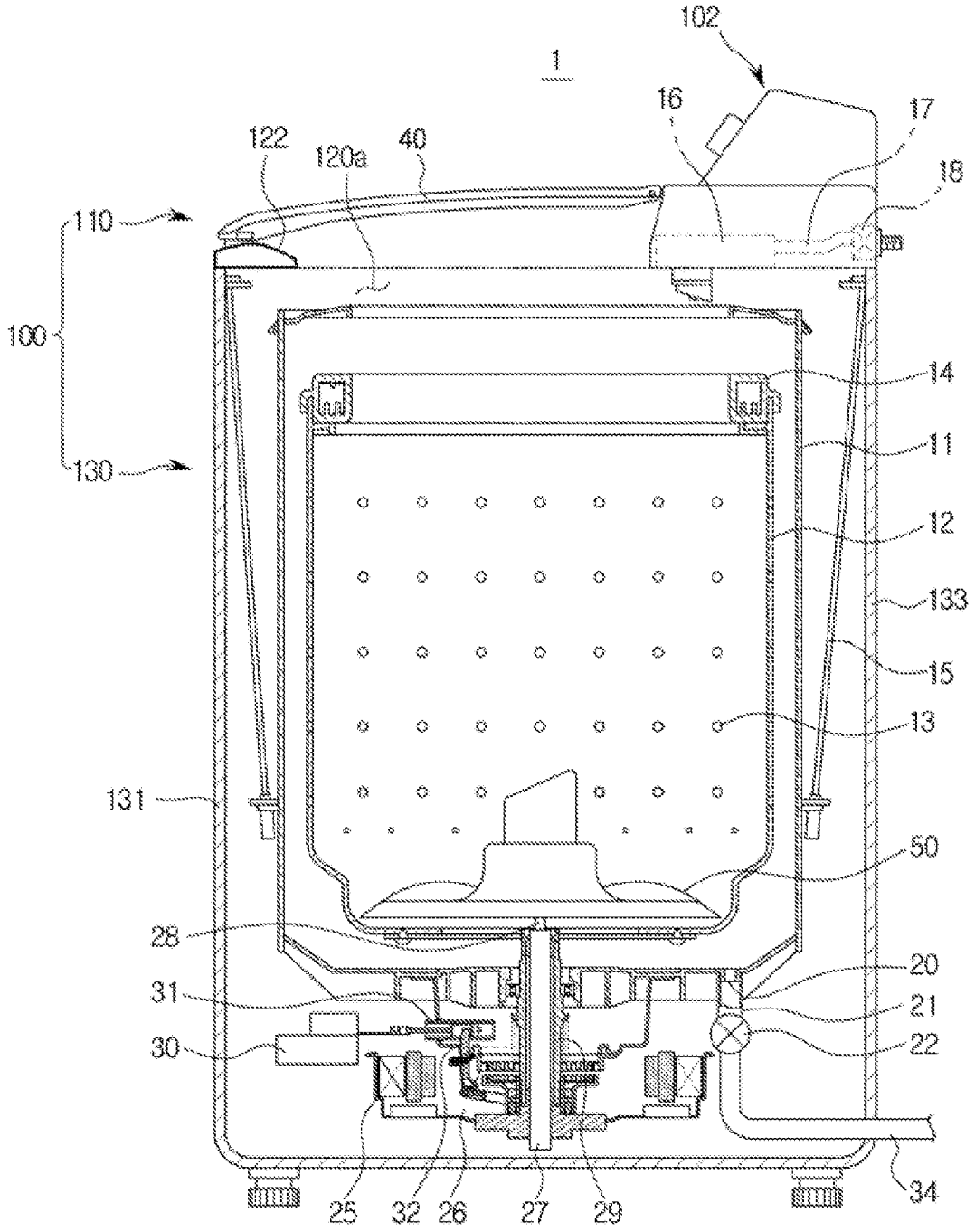
FIG. 1 is a cross-sectional view of a washing machine according to an embodiment of the present disclosure.
Figure 2:
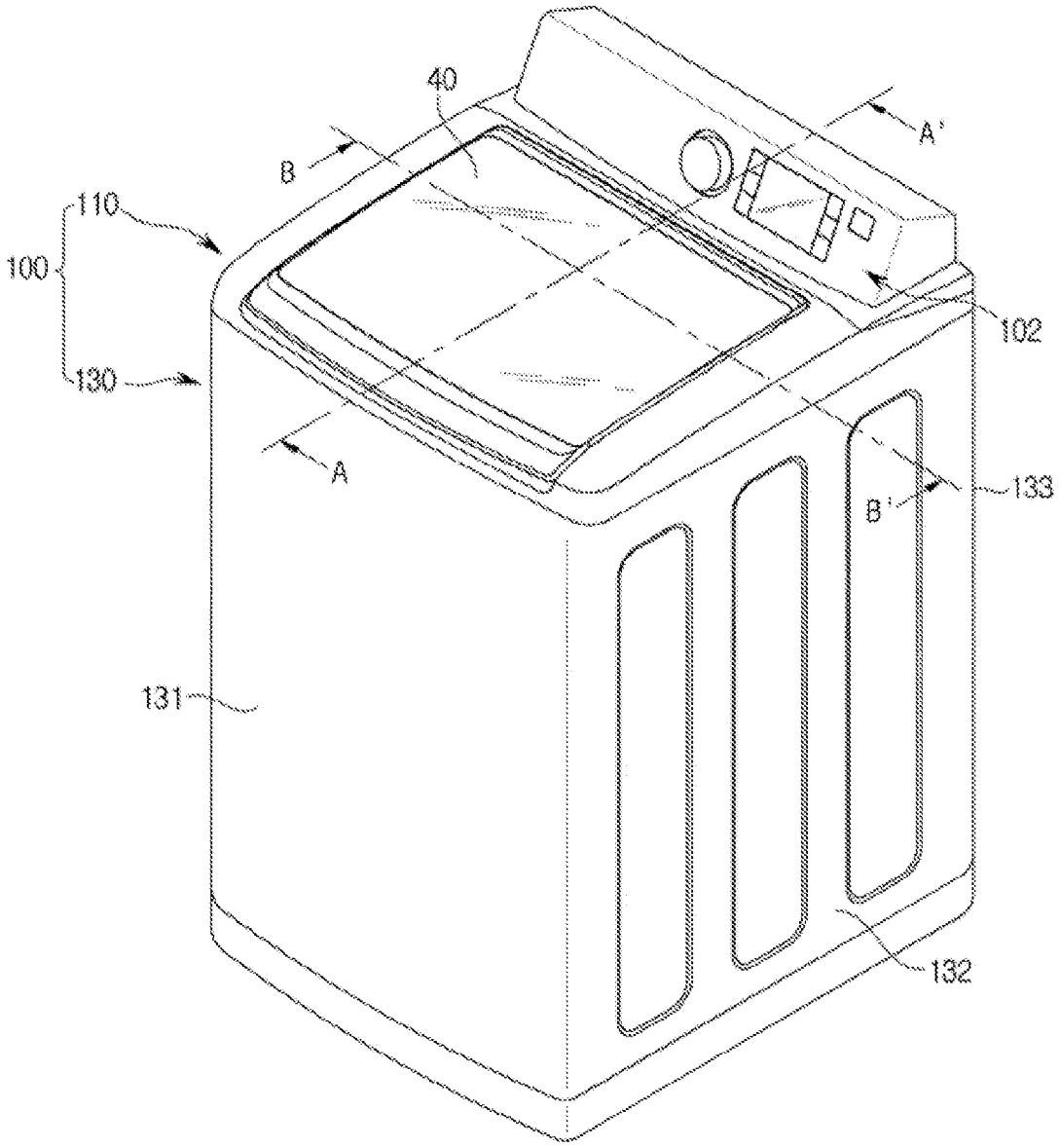
FIG. 2 is a perspective view of the washing machine according to an embodiment of the present disclosure.

FIG. 1 is a cross-sectional view illustrating a washing machine according to an embodiment of the present disclosure, and FIG. 2 is a perspective view illustrating the washing machine according to an embodiment of the present disclosure.

As illustrated in FIG. 1, a washing machine 1 includes a cabinet 100 that forms an exterior, a fixed tub 11 disposed in the cabinet 100 and in which wash water is stored, a rotating tub 12 rotatably disposed in the fixed tub 11, and a pulsator 50 disposed in the rotating tub 12 to generate a water flow.

An opening 120a is formed at an upper portion of the cabinet 100 to be able to insert laundry in the rotating tub 12. The opening 120a may be covered and uncovered by a door 40 installed at the upper portion of the cabinet 100.

The cabinet 100 may include an upper frame 110 and a lower frame 130. The lower frame 130 may include a front frame 131 provided at a front surface thereof, a pair of side frames 132 provided at side surfaces thereof to face each other and coupled to the front frame 131, and a rear frame 133 connected to the side frames 132, and provided to face the front frame 131. The upper frame 110 may be provided above the lower frame 130, and include the opening 120a.

The fixed tub 11 may be supported by a suspension system 15 in the cabinet 100.

A water supply pipe 17 for supplying wash water to the fixed tub 11 is installed above the fixed tub 11. One side of the water supply pipe 17 is connected to an external water supply source, and the other side of the water supply pipe 17 is connected to a detergent supply device 16. Water supplied through the water supply pipe 17 passes through the detergent supply device 16 and is supplied to an inner portion of the fixed tub 11 together with a detergent. A water supply valve 18 is installed at the water supply pipe 17 to control a supply of water.

An auxiliary detergent supply device 104 (FIG. 3) may be provided at the upper frame 110. A liquid detergent, bleaching agent, fabric conditioner, etc. may be stored in the auxiliary detergent supply device 104, and introduced into the rotating tub 12 to assist in the washing.

The rotating tub 12 is provided in a shape of a cylinder with an open upper portion, and a plurality of dehydration holes 13 are formed at a side surface thereof. A balancer 14 may be mounted at an upper portion of the rotating tub 12 to enable the rotating tub 12 to stably rotate when rotating at a high speed.

A motor 25 that generates a driving force for rotating the rotating tub 12 and the pulsator 50, and a power switching device 26 that transfers the driving force from the motor 25 to the rotating tub 12 and/or the pulsator 50 are installed outside and below the fixed tub 11.

A hollow dehydration shaft 29 may be coupled to the rotating tub 12, and a washing shaft 27 installed at a hollow portion of the hollow dehydration shaft 29 may be coupled to the pulsator 50 through a washing shaft coupling part 28. The motor 25 may transfer the driving force to the rotating tub 12 and/or the pulsator 50 in accordance with actions of the power switching device 26.

The power switching device 26 may include an actuator 30 that generates a driving force for switching power, a rod part 31 that moves linearly in accordance with motion of the actuator 30, and a clutch part 32 connected to the rod part 31 to rotate in accordance with motion of the rod part 31.

A drain hole 20 is formed at a floor of the fixed tub 11 to discharge the wash water stored in the fixed tub 11, and a first drain pipe 21 is connected to the drain hole 20. A drain valve 22 that regulates drainage may be installed at the first drain pipe 21. An outlet of the drain valve 22 may be connected to a second drain pipe 34 for discharging the wash water to the outside.

Figure 3:
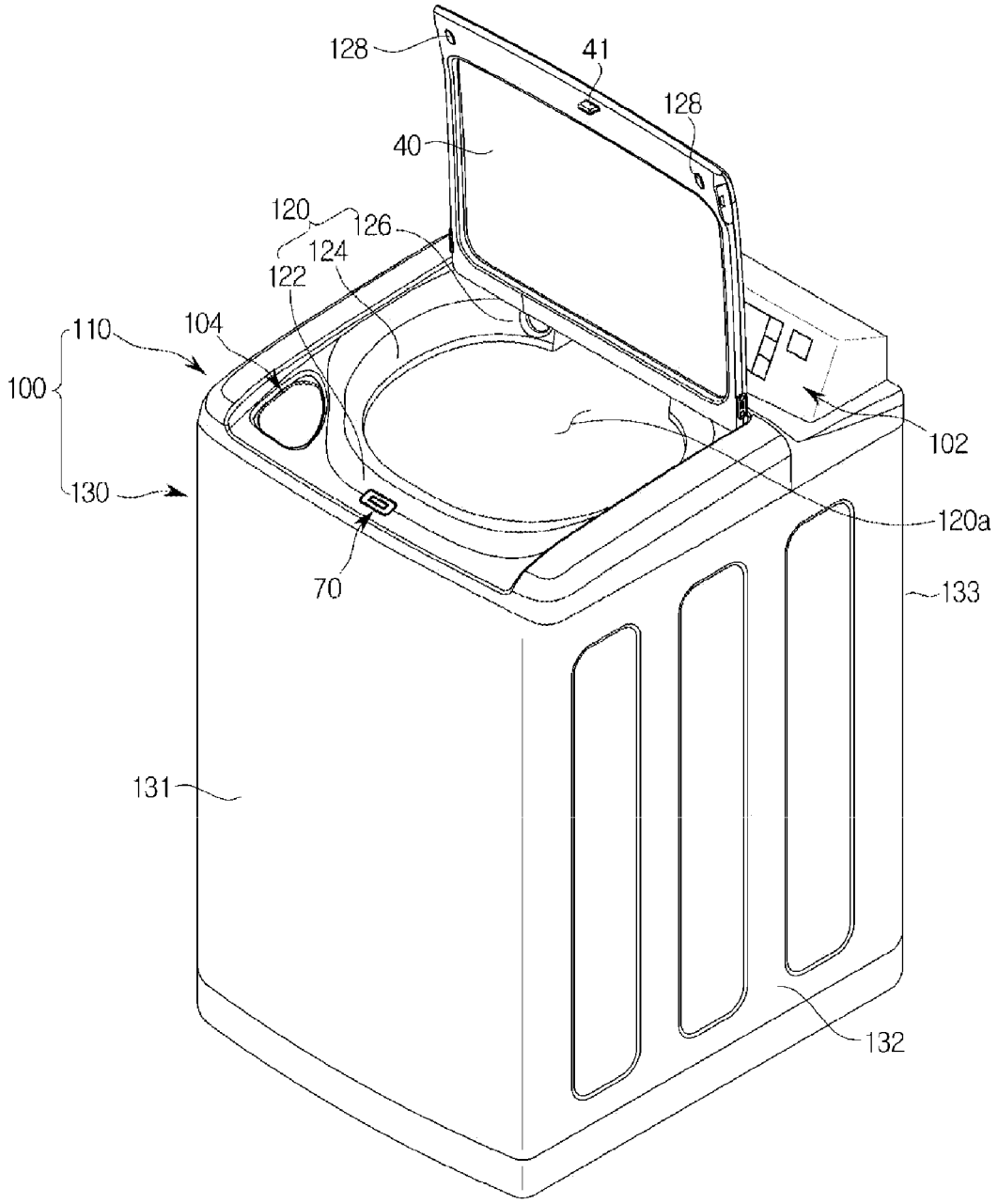
FIG. 3 is a perspective view in which a door of the washing machine is opened according to an embodiment of the present disclosure.
Figure 4:
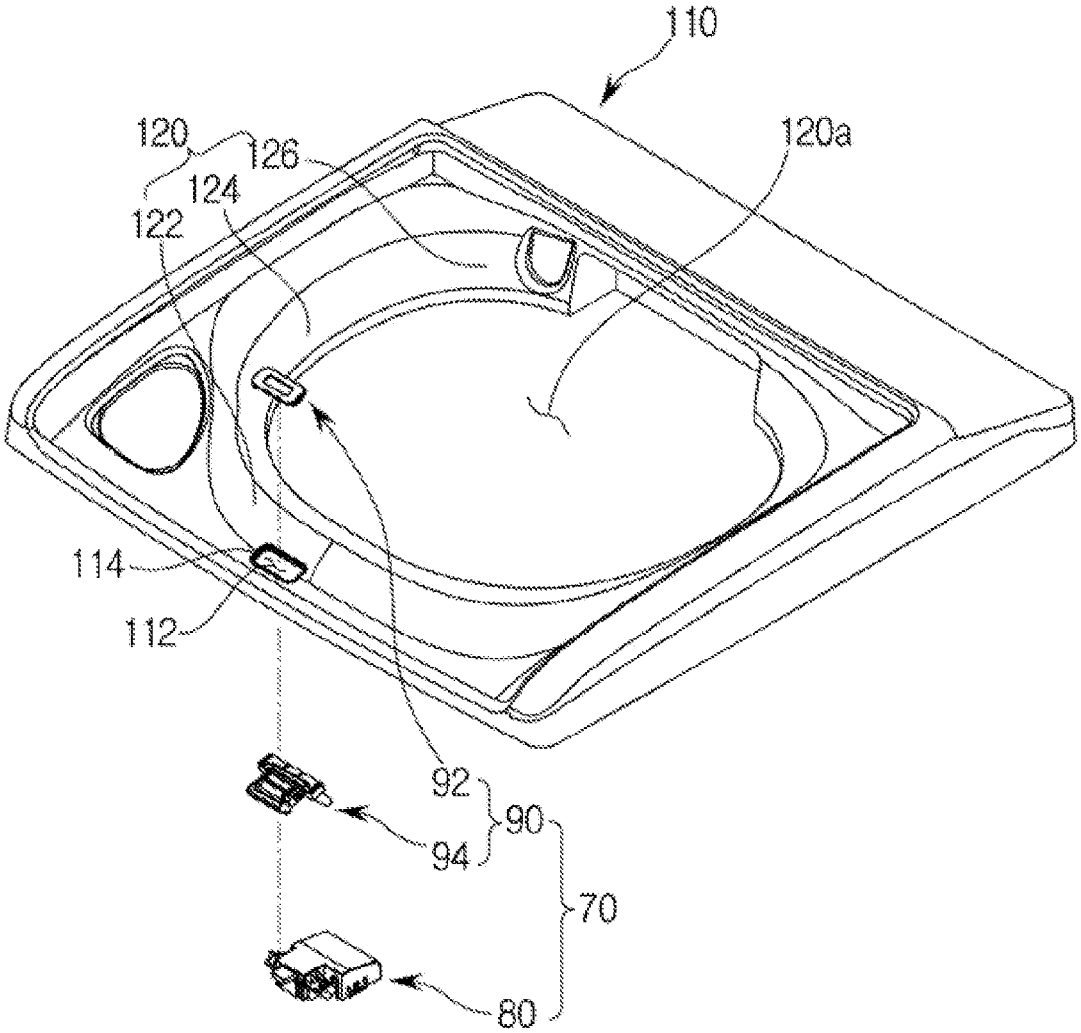
FIG. 4 is an exploded perspective view of a upper frame and a door locking device of the washing machine according to an embodiment of the present disclosure.

FIG. 3 is a perspective view in which a door of the washing machine is opened according to an embodiment of the present disclosure, and FIG. 4 is an exploded perspective view of an upper frame and a door locking device of the washing machine according to an embodiment of the present disclosure.

The washing machine 1 may include the door 40 at the upper frame 110, which is an upper portion of the cabinet 100, and the door may open and close to uncover and cover the opening 120a, respectively. The washing machine may include a door locking device 70 that is capable of selectively restraining the door 40 when the door 40 has closed the opening 120a.

The door 40 may include a locking member 41 to enable the door locking device 70 to restrain the door 40, and the locking member 41 may be inserted into the cabinet 100 when the door 40 is closed. Specifically, the locking member 41 may be inserted into the upper frame 110.

A shape of the locking member 41 is not limited, and the locking member 41 may be formed in various shapes such as a shape of a hook, ring, etc.

The door locking device 70 may be disposed in the cabinet 100 to correspond to a position of the locking member 41 provided at the door 40. Specifically, the door locking device may be disposed to be supported at the upper frame 110 of the cabinet 100. In an embodiment of the present disclosure, the locking member 41 may be disposed at a center portion of a front portion of the door 40, and the door locking device 70 may correspond thereto and be disposed at a center portion of a front portion of the upper frame 110.

As the door locking device 70 restrains the door 40, the door 40 may be prevented from being lifted from the opening 120a, and become capable of stably covering the opening 120a. As illustrated in FIG. 3, the upper frame 110 may include an opening flange 120 formed around the opening 120a. The opening flange 120 of the upper frame 110 may include a through-hole 112 (FIG. 4) into which the door locking device 70 is inserted *without the locking switch 80 protruding outside the cabinet 100 or otherwise being exposed to the outside of the cabinet 100* (*as shown in FIGS. 1, 4, 7, and 10*), and a mounting part 114 around the through-hole 112. The door locking device 70 that restrains the door 40 when the door 40 has closed to cover the opening 120a is mounted on the mounting part 114 to correspond to the position of the locking member 41 of the door, i.e. a position of the through-hole 112. The mounting part 114 may not protrude past the opening flange 120, and an upper surface of the opening flange 120 may be formed flat. In a washing machine according to various embodiments of the present disclosure, since the locking member 41 of the door 40 is inserted into the upper frame 110, and the door locking device 70 enables restraining the locking member 41 at an inner portion of the upper frame 110, i.e. a lower portion of the opening flange 120, a front portion of the opening flange 120 may be flat. In addition, since there is no protruding part from the front portion of the opening flange 120, the opening 120a may be made wider. Accordingly, loading and unloading laundry may be made easier.

A shape of the front portion of the opening flange 120 is not limited, and may be any shape as long as the shape enables the door 40 to close to cover the opening 120a. In an embodiment of the present disclosure, the shape of the front portion of the opening flange 120 and the shape of the front portion of the door 40 are formed flat, such that the front portion of the door 40 fits the front portion of the opening flange 120 when the door 40 is closed.

Figure 5:
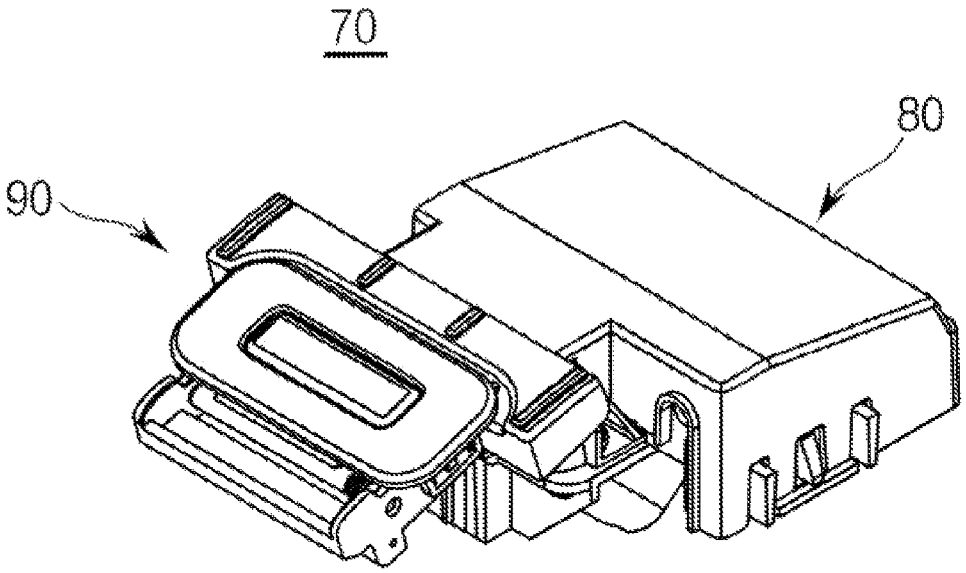
FIG. 5 is a perspective view of the door locking device of the washing machine according to an embodiment of the present disclosure.
Figure 7:
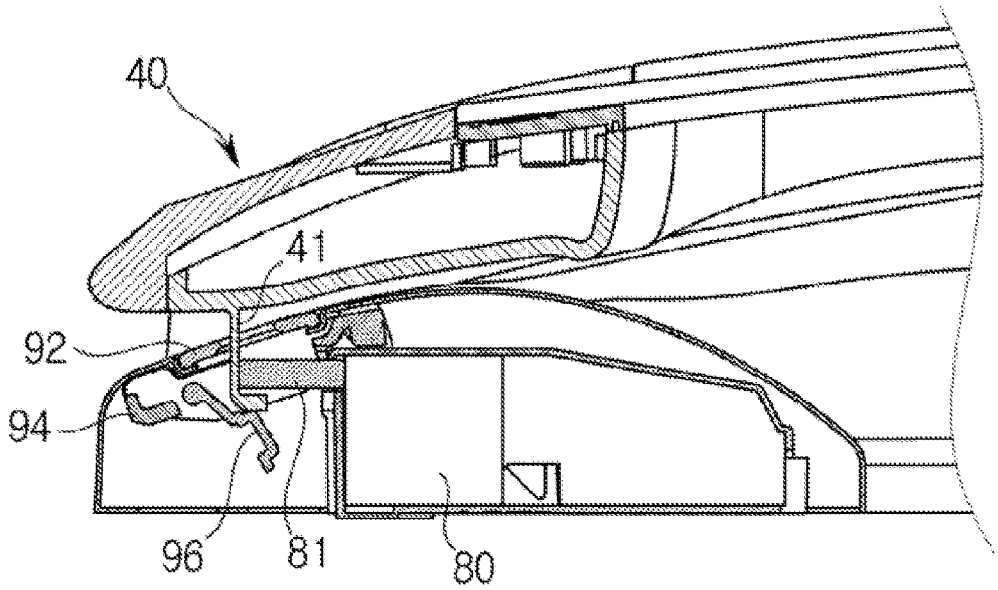
FIG. 7 is a partially enlarged view of a cross-sectional view of a mounting part of an upper frame of the washing machine along the line A-A' illustrated in FIG. 2 according to an embodiment of the present disclosure.

FIG. 5 is a perspective view of the door locking device of the washing machine according to an embodiment of the present disclosure, FIG. 6 is an exploded perspective view of the door locking device of the washing machine according to an embodiment of the present disclosure, and FIG. 7 is a partially enlarged view of a cross-sectional view of a mounting part of an upper frame of the washing machine along the line A-A' illustrated in FIG. 2 according to an embodiment of the present disclosure.

The door locking device 70 may include a locking switch 80 *inserted into the upper frame 110 of the cabinet 100 and* that restrains the locking member 41, and a mounting unit 90 for mounting the locking switch 80 on the upper frame 110. One side of the mounting unit 90 may be coupled to the mounting part 114, and the other side thereof may be coupled to the locking switch 80.

As illustrated in FIG. 6, the mounting unit 90 may include an upper unit 92 disposed above the mounting part 114, and a lower unit 94 disposed below the mounting part 114.

The upper unit 92 and the lower unit 94 may be coupled to the opening flange 120 with the mounting part 114 in between. The locking switch 80 coupled to the lower unit 94 may be mounted on a lower portion of the opening flange 120 by coupling between the upper unit 92 and the lower unit 94.

To couple the upper unit 92 and the lower unit 94, one of the upper unit 92 and the lower unit 94 may include a locking protrusion 99, and the other one may include a coupling hole 98 that couples to the locking protrusion 99. Accordingly, the upper unit 92 and the lower unit 94 may be coupled to each other by snap fitting the locking protrusion 99 and the coupling hole 98.

The lower unit 94 may include a locking switch coupling part 942 capable of being coupled to the locking switch 80, and the locking switch 80 may include a mounting unit coupling part 83 to which the locking switch coupling part 942 may be coupled.

A screw hole (not shown) may be formed at one end of the locking switch coupling part 942, and the locking switch coupling part 942 may be coupled to the locking switch 80 by a screw after being inserted into the mounting unit coupling part 83.

The locking switch 80 *is positioned rearward of the locking member 41 inserted into the upper frame 110 of the cabinet 100 and* may include a sliding member 81 capable of restraining the locking member 41 of the door 40 *by sliding forward toward the locking member 41*, and a locking switch main body 82.

The sliding member 81 may latch the door 40 when the door 40 has closed to cover the opening 120a. Specifically, when the door 40 is closed, the sliding member 81, *which is reciprocally movable in a front to back direction,* slides forward into the locking member 41 provided at the door 40, thereby preventing the door 40 from opening.

When a washing operation of the washing machine starts after the door 40 is closed, the sliding member 81, *which is reciprocally movable in a front to back direction,* slides forward *toward the locking member 41* to restrain the locking member 41 of the door 40, thereby preventing the door 40 from being opened during operation of the washing machine. A door open/close detection sensor *811* ([not] shown *in phantom in FIG. 6*) may be disposed together, such that the sliding member moves in accordance with a door open/close detection signal.

Even though a shape of the sliding member 81 is not limited, the sliding member 81 may have upper and lower surfaces that are wider than side surfaces in various embodiments of the present disclosure.

The upper unit 92 of the mounting unit 90 may have an accommodation hole 91 that corresponds to the through-hole 112 and is capable of accommodating the locking member 41.

Since the accommodation hole 91 is disposed to accommodate the locking member 41 of the door, the accommodation hole 91 may guide the door 40 to be seated correctly when the door 40 is closed to cover the opening 120a.

The lower unit 94 may include a flip cover 96 capable of opening and closing the accommodation hole 91. The flip cover 96 may include a cover part 961 that closes the accommodation hole 91, a hinge shaft 962, a hinge coupling protrusion 963, and a closing member 97.

The hinge coupling protrusion 963 is inserted into a hinge coupling hole 941 of the lower unit 94, such that the cover part 961 rotates by the hinge shaft 962. The closing member 97 forces the cover part 961 upward when the door 40 is open to prevent, for example, debris from falling through the accommodation hole 91. When the door 40 is closed, the cover part 961 is pushed open by the locking member 41.

Various embodiments of the present disclosure may include a door open/close detection sensor (not shown) that detects rotation of a rotary shaft of the door 40. The open/close detection sensor may be any sensor appropriate for such purposes.

The door open/close detection sensor is a sensor that may detect when the door 40 does not properly cover the opening 120a. The open/close detection sensor may be any sensor appropriate for such purposes.

As the door open/close detection sensor is disposed, when the opening 120a is not properly covered by the door 40, the door open/close detection sensor may be able to notify a control unit (not shown) such that the cover part 961 may not open and/or the sliding member 81 may be prevented from latching the door 40, and washing operation may not be allowed to take place. Additionally, an alarm may be generated. The control unit may be any processing unit appropriate for such purposes.

In an embodiment of the present disclosure, the flip cover 96 may be opened and closed in accordance with a signal from the door open/close detection sensor. The open/close detection sensor may be any sensor appropriate for such purposes.

Figure 8:
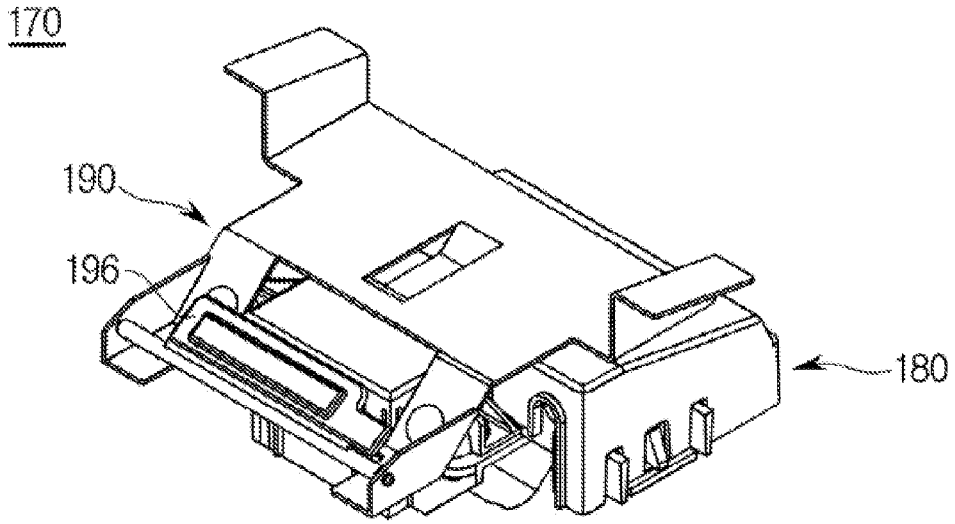
FIG. 8 is a perspective view of a door locking device of a washing machine according to an embodiment of the present disclosure.
Figure 9:
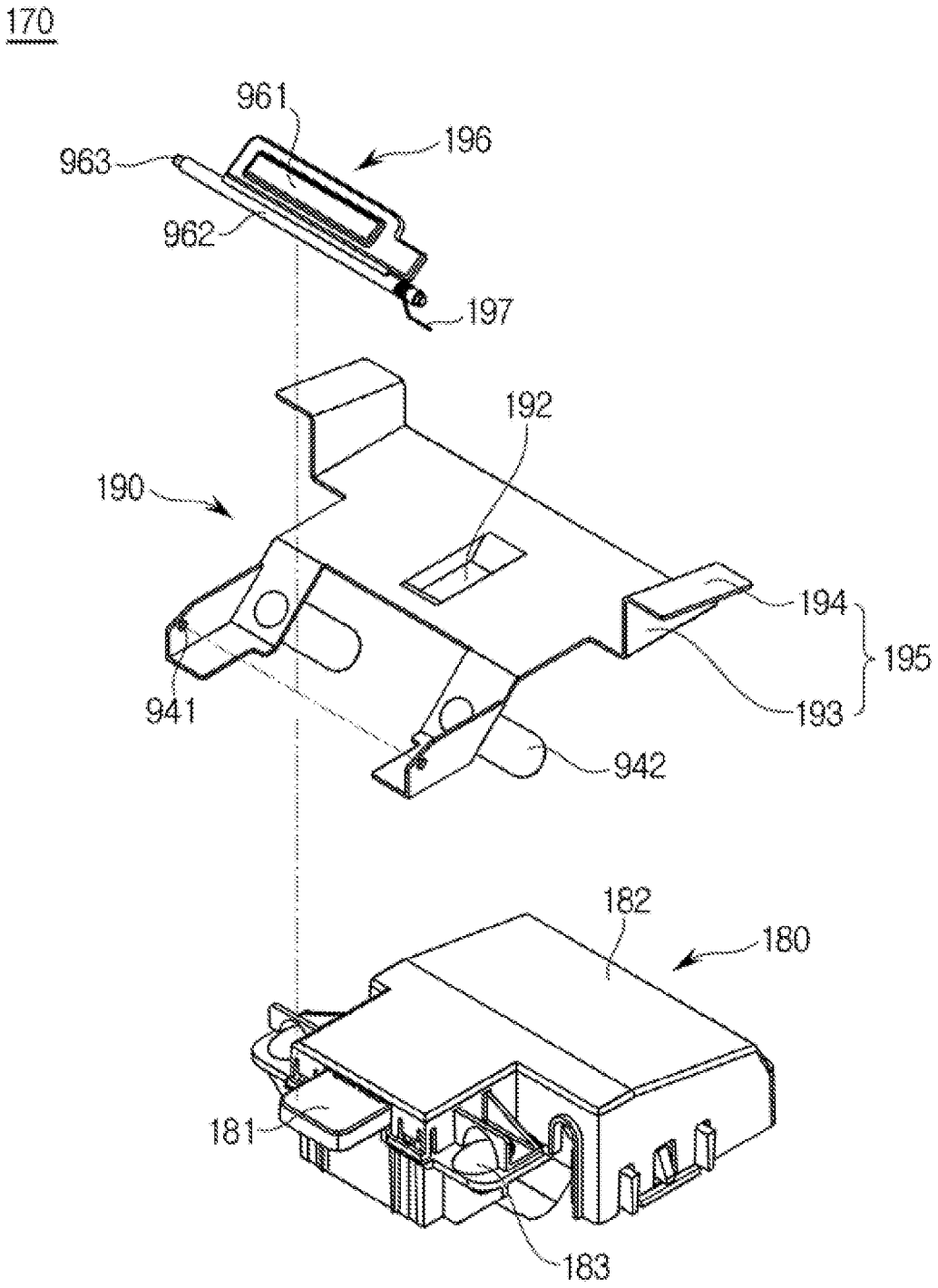
FIG. 9 is an exploded perspective view of the door locking device of the washing machine according to an embodiment of the present disclosure.
Figure 10:
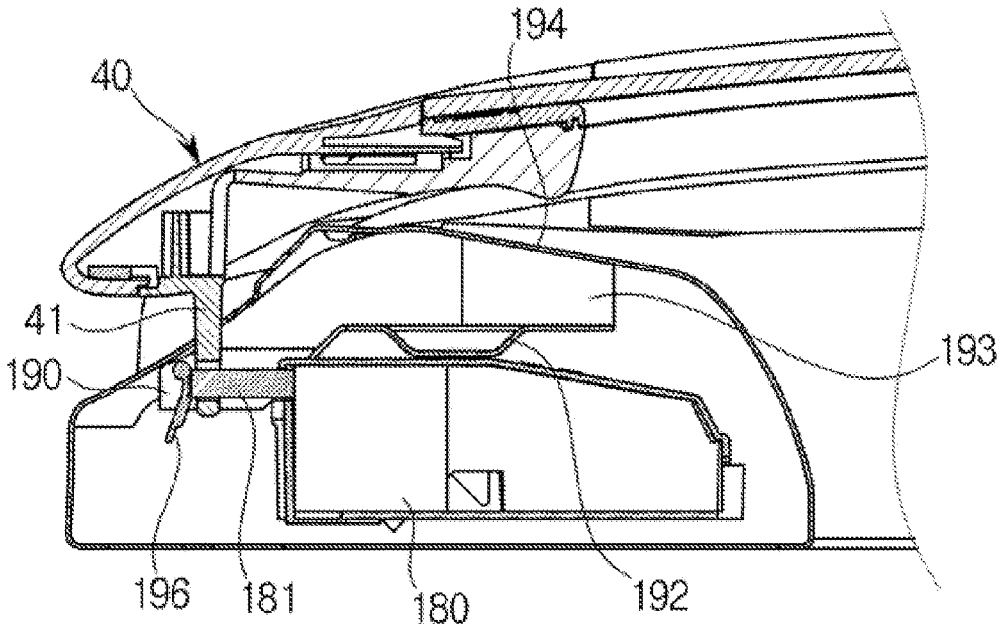
FIG. 10 is a partially enlarged view of a cross-sectional view of a mounting part of a upper frame of the washing machine along the line A-A' illustrated in FIG. 2 according to an embodiment of the present disclosure.

FIG. 8 is a perspective view of a door locking device of a washing machine according to another embodiment of the present disclosure. FIG. 9 is an exploded perspective view of the door locking device of the washing machine according to another embodiment of the present disclosure, and FIG. 10 is a partially enlarged view of a cross-sectional view of a mounting part of a upper frame of the washing machine along the line A-A' illustrated in FIG. 2 according to another embodiment of the present disclosure.

A door locking device 170 *inserted into the upper frame 110 of the cabinet 100* may include a locking switch 180 that restrains the locking member 41, and a mounting unit 190 for mounting the locking switch 180 on the upper frame 110. One side of the mounting unit 190 may be coupled to the mounting part 114, and the other side thereof may be coupled to the locking switch 180.

The mounting unit 190 may include a coupling flange 195 to couple the door locking device 170 to the upper frame 110. Specifically, the coupling flange 195 may be formed of a vertical surface 193 and a horizontal surface 194, and the horizontal surface 194 may be, for example, welded to a bottom surface of the opening flange to couple the door locking device 170 to the upper frame 110.

The locking switch 180 that couples to the mounting unit 190 may be mounted, for example, on the lower portion of the opening flange 120 by coupling between the mounting unit 190 and the opening flange 120.

The mounting unit 190 may include the locking switch coupling part 942 capable of being coupled to the locking switch 180, and the locking switch 180 may include a mounting unit coupling part 183 to which the locking switch coupling part 942 may be coupled.

A screw hole (not shown) may be formed at one end of the locking switch coupling part 942, and the locking switch coupling part 942 may be coupled to the locking switch 180 by a screw after being inserted into the mounting unit coupling part 183.

The locking switch 180 *is positioned rearward of the locking member 41 inserted into the upper frame 110 of the cabinet 100 and* may include a sliding member 181 capable of restraining the locking member 41 of the door 40 *by sliding forward toward the locking member 41*, and a locking switch main body 182.

The locking switch main body 182 may contact a seating part 192 provided at the mounting unit 190.

The sliding member 181 may latch the door 40 when the door 40 has closed the opening 120a. Specifically, the sliding member 181, *which is reciprocally movable in a front to back direction,* may slide forward into the upper frame 110 to latch the locking member 41 provided at the door 40, thereby restraining the door 40 from opening.

When a washing operation starts after the door 40 is closed, the sliding member 181, *which is reciprocally movable in a front to back direction,* slides forward to restrain the locking member 41 of the door 40, thereby preventing the door 40 from being opened during operation of the washing machine. The door open/close detection sensor [(not shown)] *811* may be disposed together, such that the sliding member moves in accordance with a door open/close detection signal.

Even though a shape of the sliding member 181 is not limited, the sliding member 181 may be provided to have upper and lower surfaces wider than side surfaces in an embodiment of the present disclosure.

The mounting unit 190 may include a flip cover 196 capable of covering and uncovering the through-hole 112.

In a present embodiment of the present disclosure, since the through-hole 112 is disposed to correspond to the locking member 41 of the door 40, the through-hole 112 may guide the door 40 to be seated accurately when the door 40 is closed to cover the opening 120a.

The flip cover 196 may include the cover part 961 that closes the through-hole 112, the hinge shaft 962, the hinge coupling protrusion 963, and a closing member 197.

The hinge coupling protrusion 963 is inserted into the hinge coupling hole 941 of the mounting unit 190 such that the cover part 961 rotates on the hinge shaft 962. The closing member 197 forces the cover part 961 upward to prevent, for example, debris from falling through the accommodation hole 91. When the door 40 is closed, the cover part 961 is pushed open by the locking member 41.

In various embodiments of the present disclosure, the flip cover 196 may be able to be opened and closed in accordance with a signal from the door open/close detection sensor. The open/close detection sensor may be any sensor appropriate for such purposes.

Figure 11:
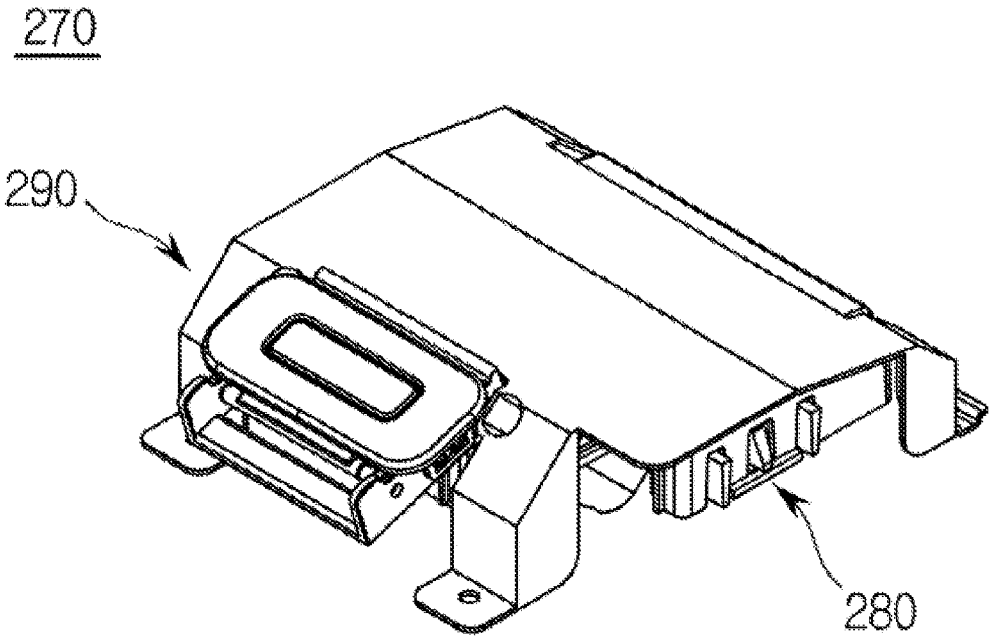
FIG. 11 is a perspective view of a door locking device of a washing machine according to an embodiment of the present disclosure.
Figure 12:
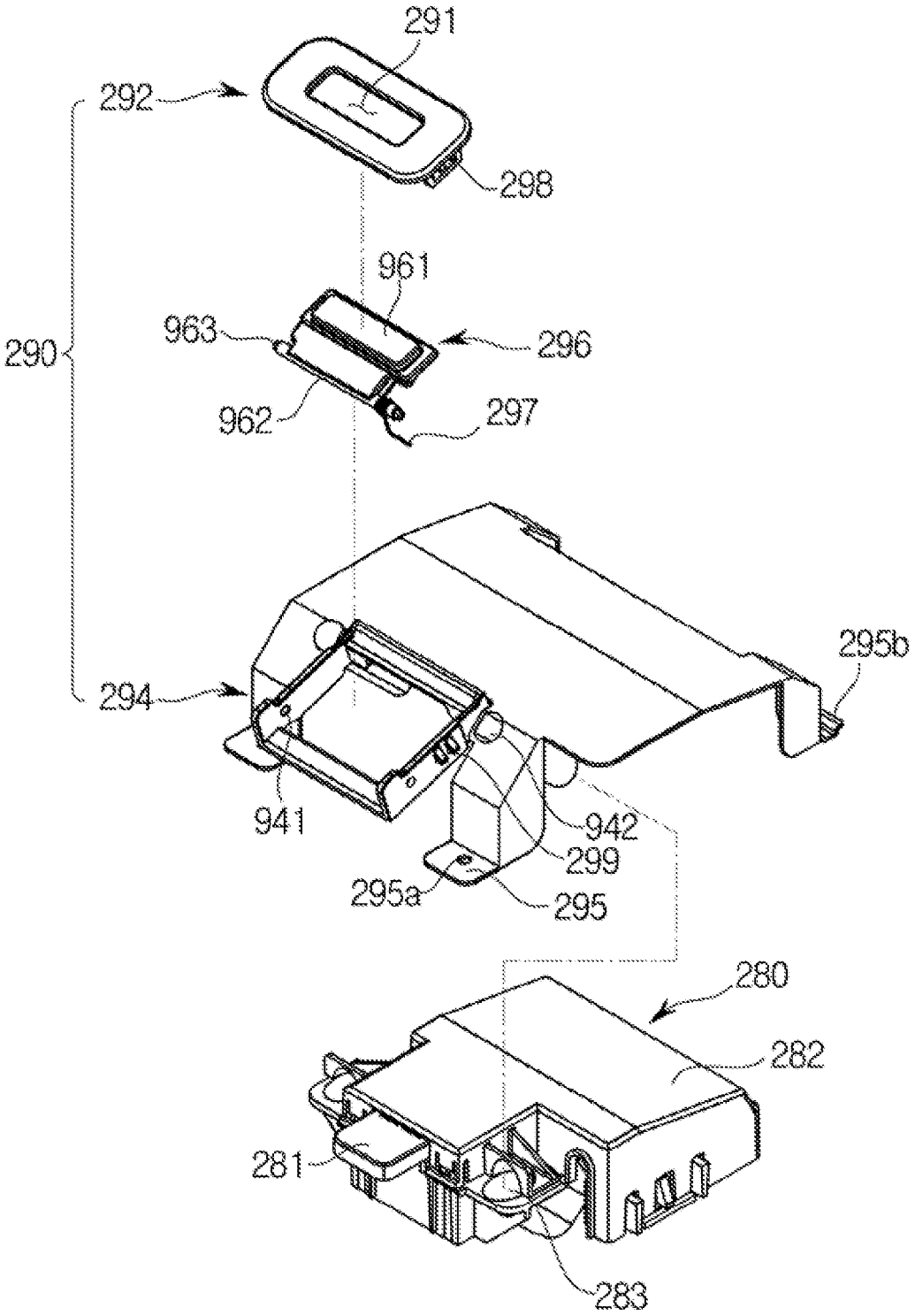
FIG. 12 is an exploded perspective view of the door locking device of the washing machine according to an embodiment of the present disclosure.
Figure 13:
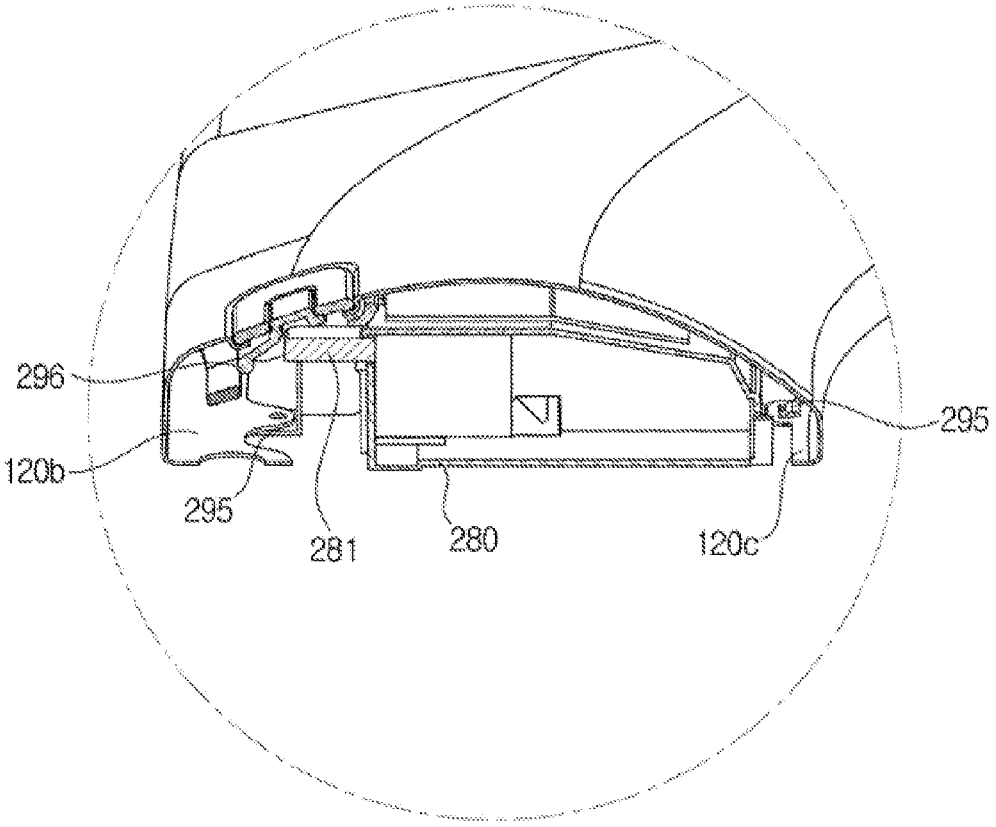
FIG. 13 is a partially enlarged view of a cross-sectional view of a mounting part of an upper frame of the washing machine along the line A-A' illustrated in FIG. 2 according to an embodiment of the present disclosure.

FIG. 11 is a perspective view of a door locking device of a washing machine according to still another embodiment of the present disclosure. FIG. 12 is an exploded perspective view of the door locking device of the washing machine according to still another embodiment of the present disclosure, and FIG. 13 is a partially enlarged view of a cross-sectional view of a mounting part of an upper frame of the washing machine along the line A-A' illustrated in FIG. 2 according to still another embodiment of the present disclosure.

A door locking device 270 may include a locking switch 280 that restrains the locking member 41, and a mounting unit 290 for mounting the locking switch 280 on the upper frame 110. One side of the mounting unit 290 may be coupled to the mounting part 114, and the other side thereof may be coupled to the locking switch 280.

As illustrated in FIG. 12, the mounting unit 290 may include an upper unit 292 disposed above the mounting part 114, and a lower unit 294 disposed below the mounting part 114.

The upper unit 292 and the lower unit 294 may be coupled to the opening flange 120 while having the mounting part 114 therebetween.

To couple the upper unit 292 and the lower unit 294, one of the upper unit 292 and the lower unit 294 may include a locking protrusion 299, and the other one may include a coupling hole 298 that couples to the locking protrusion 299. By snap fitting the locking protrusion 299 and the coupling hole 298, the upper unit 292 and the lower unit 294 may be coupled to each other.

The lower unit 294 may include the locking switch coupling part 942 capable of being coupled to the locking switch 280, and the locking switch 280 may include a mounting unit coupling part 283 to which the locking switch coupling part 942 may be coupled.

A screw hole (not shown) may be formed at one end of the locking switch coupling part 942, and the locking switch coupling part 942 may be coupled to the locking switch 280 by a screw after being inserted into the mounting unit coupling part 283.

The lower unit 294 may include at least one coupling flange 295 to couple the door locking device 270 to the upper frame 110. Specifically, a coupling hole 295a is formed at one of either the front or rear of coupling flange 295 to be coupled to a screw coupling flange 120b of the upper frame 110 by a screw, and a bent part 295b is formed at the other of the front or rear of the coupling flange 295 to be coupled to a hook coupling flange 120c of the upper frame 110.

In each of the parts, the coupling flange 295 and the upper frame 110 may use, for example, screw coupling or a hook structure to fix the lower unit 294 to the upper frame 110.

The locking switch 280 that couples to the lower unit 294 may be mounted on the inner portion of the upper frame 110 by coupling the lower unit 294 and the upper frame 110.

The mounting unit 290 may include the locking switch coupling part 942 capable of being coupled to the locking switch 280, and the locking switch 280 may include the mounting unit coupling part 283 to which the locking switch coupling part 942 may be coupled.

A screw hole (not shown) may be formed at one end of the locking switch coupling part 942, and the locking switch coupling part 942 may be coupled to the locking switch 280 by a screw after being inserted into the mounting unit coupling part 283.

The locking switch 280 *is positioned rearward of the locking member 41 inserted into the upper frame 110 of the cabinet 100 and* may include a sliding member 281 capable of restraining the locking member 41 of the door 40 *by sliding forward toward the locking member 41*, and a locking switch main body 282.

The sliding member 281 may restrain the door 40 by a sliding motion when the door 40 has closed to cover the opening 120a. Specifically, the sliding member 281, *which is reciprocally movable in a front to back direction,* slides forward *toward the locking member 41 and* in the upper frame 110 to latch the locking member 41 of the door 40, thereby restraining the door 40 from opening.

When the door 40 is closed, the sliding member 281, *which is reciprocally movable in a front to back direction,* slides forward to restrain the locking member 41 of the door 40, thereby preventing the door 40 from being opened during operation of the washing machine. The door open/close detection sensor (not shown) may be disposed together, such that the sliding member moves in accordance with a door open/close detection signal.

Even though a shape of the sliding member 281 is not limited, the sliding member 281 may be provided to have upper and lower surfaces wider than side surfaces in an embodiment of the present disclosure.

The upper unit 292 of the mounting unit 290 may have an accommodation hole 291 that corresponds to the through-hole 112 and is capable of accommodating the locking member 41.

Since the accommodation hole 291 is disposed to correspond to the locking member 41 of the door, the accommodation hole 291 may guide the door 40 to be seated accurately when the door 40 is closed to cover the opening 120a.

The lower unit 294 may include a flip cover 296 capable of opening and closing the accommodation hole 291. The flip cover 296 may include the cover part 961 that covers the accommodation hole 291, the hinge shaft 962, the hinge coupling protrusion 963, and a closing member 297.

The hinge coupling protrusion 963 is inserted into the hinge coupling hole 941 of the lower unit 294 such that the cover part 961 rotates by the hinge shaft 962. The closing member 297 forces the cover part 961 upward when the door 40 is open to prevent, for example, debris from falling through the accommodation hole 91. When the door 40 is closed, the cover part 961 is pushed open by the locking member 41.

In an embodiment of the present disclosure, the flip cover 296 may be opened and closed in accordance with a signal from a door open/close detection sensor. The open/close detection sensor may be any sensor appropriate for such purposes.

Figure 14:
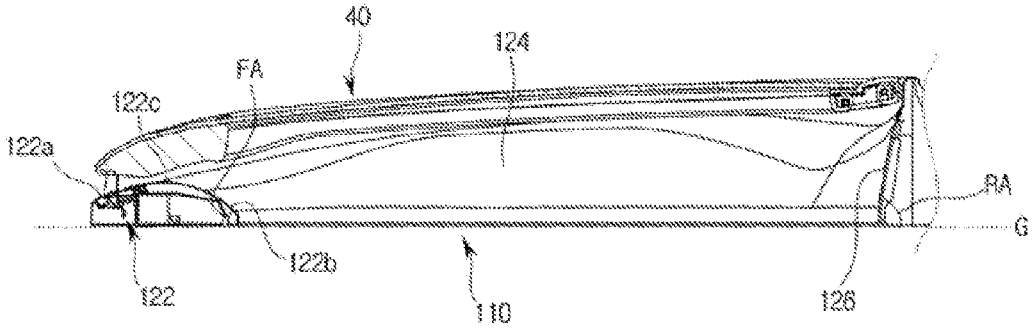
FIG. 14 is a cross-sectional view of the upper frame of the washing machine along the line A-A' illustrated in FIG. 2 according to an embodiment of the present disclosure.
Figure 15:
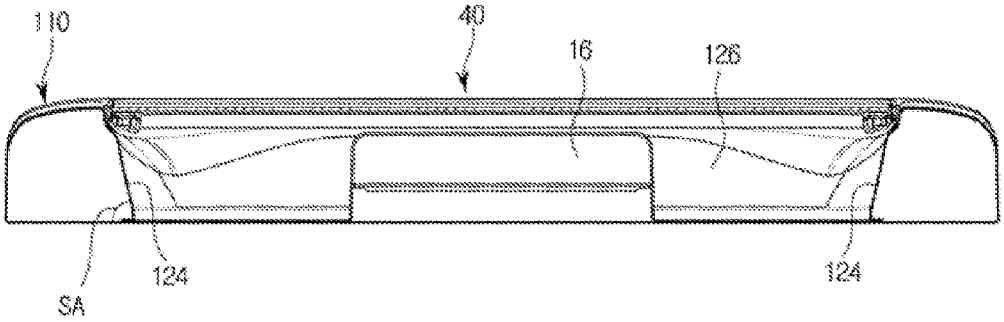
FIG. 15 is a cross-sectional view of the upper frame of the washing machine along the line B-B' illustrated in FIG. 2 according to an embodiment of the present disclosure.

FIG. 14 is a cross-sectional view taken along the line A-A' in FIG. 2, and FIG. 15 is a cross-sectional view taken along the line B-B' in FIG. 2.

As discussed with respect to at least FIGS. 1-3, the upper frame 110 may be provided above the lower frame 130, and provided to include the opening 120a. The upper frame 110 includes the opening 120a formed therein, and the opening flange 120 provided to be tilted toward the opening 120a.

As discussed with respect to at least FIGS. 2-4, the opening flange 120 includes a front flange 122 provided at the front with respect to the opening 120a, a pair of side flanges 124 formed at sides with respect to the opening 120a and provided to face each other, and a rear flange 126 provided at the rear with respect to the opening 120a, provided at the other side of the front flange 122, and connected to the pair of side flanges 124.

The front flange 122, the side flanges 124, and the rear flange 126 are formed to surround the opening 120a. As mentioned above, the front flange 122 may be provided to be convenient for a user of the washing machine to load and unload laundry, or otherwise access the tub.

In other words, the locking switches 80, 180, and 280 of the door locking devices 70, 170, and 270 that restrain the door 40 are disposed in the upper frame 110, such that the sliding members 81, 181, and 281 slide forward into the upper frame 110, and a button unit 102 (FIGS. 1-3) by which a control signal is input to the washing machine is disposed at the back of the upper frame 110. Accordingly, a structure of the front flange 122 provided at the front portion of the opening 120a may be simplified.

In various embodiments of the present disclosure, the sliding members 81, 181, and 281 are disposed to slide in the upper frame 110, such that the height of the front flange 122 may be lowered.

The front flange 122 may be provided at the front portion of the opening 120a and formed as a convex curved surface in an upward direction. In other words, the front flange 122 may be formed as a curved surface because various embodiments of the disclosure enable a configuration of the front flange 122 where the sliding members 81, 181, and 281 are allowed to slide in the upper frame 110.

Accordingly, the front flange 122 may have a gentle slope forward that may allow a user to easily load and unload laundry from the rotating tub 12, or otherwise access the rotating tub 12.

The front flange 122 may include a front inclined surface 122a in the front of the washing machine, a rear inclined surface 122b that faces the opening 120a, and a door seating part 122c that is formed between the front inclined surface 122a and the rear inclined surface 122b. The door seating part 122c may be formed to have a bottom portion of the door 40 come in contact therewith when the door 40 is closed. Although a bottom portion of the door 40 is provided to be seated on the door seating part 122c in an embodiment of the present disclosure, embodiments are not limited thereto, and a bottom portion of the door 40 may be seated on the front inclined surface 122a or the rear inclined surface 122b.

The front inclined surface 122a, the rear inclined surface 122b, and the door seating part 122c may be formed as one curved surface. As the front flange 122 is formed with one curved surface in front and rear directions, it may be easy for the user to bend his or her body and approach the inner portion of the rotating tub 12.

When an angle between the side flanges 124 and a reference ground surface G is called a side angle SA, and an angle between the rear flange 126 and the reference ground surface G is called a rear angle RA, an angle between the front inclined surface 122a and the reference ground surface G may be a front angle FA that may be less than the side angle SA or the rear angle RA. That is, the front angle FA may be smaller than the side angle SA or the rear angle RA. In other words, the opening flange 120 may be provided to have a slope from the side or rear of the opening 120a toward the front along a circumferential direction of the opening 120a. The reference ground surface G represents a virtual surface that is a reference for measuring the angles SA, FA, and RA.

The door seating part 122c is disposed at a portion in which the front inclined surface 122a and the rear inclined surface 122b meet in the front flange 122. The door seating part 122c is disposed at the other side of a rotating part of the door 40, such that the other side may be seated thereon. When the door 40 closes the opening 120a and one side of the door 40 seats on the door seating part 122c, the door locking devices 70, 170, and 270 are provided to restrain the door 40.

At least one seating pad 128 (FIG. 3) may be provided at the door 40 to prevent a noise or impact from being generated when the door 40 is closed.

The upper portion of the opening flange 120 may be formed to gradually slope down from the rear toward the front. That is, the front flange 122 is formed to be lower from the reference ground surface G than the side flanges 124 or the rear flange 126, such that the front flange 122 may enable the user to easily load or unload the laundry, or otherwise access the washing machine.

That is, when a height up to an upper portion of the front flange 122 with respect to the reference ground surface G of the upper frame 110 is h1, h1 may be formed lower than h2, which is a height from the reference ground surface G up to upper portions at any point of the side flanges 124. The reference ground surface G represents a virtual surface that becomes a reference of h1 and h2 at a lower portion of the upper frame 110. The height of h1 is not limited.

In various embodiments of the present disclosure, a locking device of a door is improved, thereby preventing opening of the door during times when the door should not be open.

In addition, a structure of an upper frame of a cabinet is improved, thereby facilitating loading and unloading laundry, and otherwise accessing an inner portion of the washing machine.

Hereinbefore, specific embodiments have been illustrated and described. However, the present disclosure is not limited to the embodiments mentioned above, and those of ordinary skill in the art to which the present disclosure pertains will be able to modify and practice the embodiments in various ways without departing from the gist of the technical spirit of the present disclosure defined in the claims below.

What is claimed:

[1. A washing machine comprising:

a cabinet;

an upper frame disposed at an upper portion of the cabinet, and including an opening and an opening flange formed around the opening, wherein the opening flange comprises a through-hole and a mounting part around the through-hole;

a door rotatably disposed at the upper frame to open and close, wherein a closed door covers the opening and an opened door uncovers the opening;

a locking member provided at the door, wherein the locking member is configured to be inserted into the upper frame when the door is closed; and a door locking device disposed to be supported by the upper frame, and configured to selectively restrain the locking member in the upper frame when the door is closed, wherein the door locking device comprises a locking switch configured to restrain the locking member, and a mounting unit in which a first side is coupled to the mounting part, and a second side is coupled to the locking switch.]

[2. The washing machine according to claim 1, wherein:

the locking member is provided at a center portion of a front portion of the door; and the door locking device is disposed at a corresponding center portion of a front portion of the upper frame.]

[3. The washing machine according to claim 1, wherein the mounting unit comprises:

an upper unit disposed above the mounting part and having an accommodation hole configured to correspond to the through-hole, wherein the accommodation hole is capable of receiving the locking member; and a lower unit disposed below the mounting part.]

[4. The washing machine according to claim 3, wherein:

the upper unit and the lower unit are configured to be coupled to the opening flange with the mounting part therebetween; and the locking switch is coupled to the lower unit and mounted on a lower portion of the opening flange by coupling between the upper unit and the lower unit.]

[5. The washing machine according to claim 3, wherein a first one of the upper unit and the lower unit comprises a locking protrusion, and a second one of the upper unit and the lower unit comprises a coupling hole that couples to the locking protrusion.]

[6. The washing machine according to claim 3, wherein the mounting unit comprises a flip cover configured to cover and uncover the accommodation hole.]

[7. The washing machine according to claim 6, wherein the mounting unit comprises a closing member configured to force the flip cover upward to cover the accommodation hole, wherein the flip cover is configured to be pushed open by the locking member as the door is closed.]

[8. The washing machine according to claim 7, wherein the lower unit comprises the flip cover and the closing member.]

[9. The washing machine according to claim 3, wherein:

the upper unit and the lower unit are coupled to the opening flange while having the mounting part therebetween;

the locking switch is coupled to the lower unit;

the lower unit comprises a coupling flange to be coupled to the upper frame; and the coupling flange is fixed in the upper frame by screw coupling or a hook structure to mount the locking switch on a lower portion of the opening flange.]

[10. The washing machine according to claim 1, wherein the locking switch comprises a sliding member that is configured to be selectively inserted into the locking member, wherein the sliding member slides in the upper frame.]

[11. The washing machine according to claim 1, wherein the mounting unit comprises a coupling flange configured to be coupled to the upper frame.]

[12. The washing machine according to claim 11, wherein the coupling flange is welded to the upper frame.]

[13. The washing machine according to claim 1, wherein the opening flange comprises:

a front flange disposed in front of the opening;

side flanges formed at both sides of the opening, and provided to face each other; and a rear flange provided at a rear of the opening, facing the front flange, and connected to the side flanges, and the door locking device is disposed at a center portion of the front flange.]

[14. The washing machine according to claim 13, wherein the front flange comprises:

a front inclined surface inclined downward toward a front of the upper frame;

a rear inclined surface inclined downward toward the opening; and a door seating part formed between the front inclined surface and the rear inclined surface, wherein a forward portion of the door is seated on a door seating frame when the door is closed.]

[15. The washing machine according to claim 14, wherein an angle between the front inclined surface and a reference ground surface is smaller than an angle between the side flanges and the reference ground surface.]

[16. The washing machine according to claim 14, wherein the front inclined surface, the rear inclined surface, and the door seating part are formed as one curved surface.]

[17. The washing machine according to claim 13, wherein the opening flange is formed to be gradually sloped downward from a rear of the opening flange toward a front of the opening flange.]

[18. The washing machine according to claim 13, wherein a height from a reference ground surface to an upper portion of the front flange is less than a height from the reference ground surface to upper portions of the side flanges.]

[19. A washing machine comprising:

a cabinet;

an upper frame disposed at an upper portion of the cabinet, and including an opening and an opening flange formed around the opening;

a door rotatably disposed at the upper frame to open and close, wherein a closed door covers the opening and an opened door uncovers the opening;

a locking member provided at the door, wherein the locking member is configured to be inserted into the upper frame when the door is closed; and a door locking device disposed to be supported by the upper frame, and configured to selectively restrain the locking member in the upper frame when the door is closed, wherein the door locking device comprises:

a locking switch configured to restrain the locking member;

an upper unit disposed above the opening flange and having an accommodation hole configured to be capable of accommodating the locking member; and a lower unit disposed below the opening flange, and having a first side of the lower unit coupled to the upper unit and a second side of the lower unit coupled to the locking switch.]

[20. The washing machine according to claim 19, wherein a first one of the upper unit and the lower unit comprises a locking protrusion, and a second one of the upper unit and the lower unit comprises a coupling hole that couples to the locking protrusion.]

[21. The washing machine according to claim 19, wherein the locking switch comprises a sliding member that is configured to be selectively inserted into the locking member.]

[22. The washing machine according to claim 19, wherein the upper unit comprises a flip cover configured to cover and uncover the accommodation hole.]

[23. The washing machine according to claim 22, wherein the upper unit comprises a closing member configured to force the flip cover upward to cover the accommodation hole, wherein the flip cover is configured to be pushed open by the locking member as the door is closed.]

*24. A door locking device for locking a door to open and close an opening of a frame for a cabinet, including a through-hole, of a washing machine, the door locking device comprising:*

*a locking switch provided inside the cabinet and configured to restrain a locking member formed to the door;*

*a first mounting unit disposed above the frame, the first mounting unit including an accommodation hole to allow at least a portion of the locking member to pass through as the door closes the opening of the frame; and*

*a second mounting unit disposed below the frame and coupled to the first mounting unit with the frame interposed between the first mounting unit and the second mounting unit, the second mounting unit coupled to the locking switch to mount the locking switch inside the cabinet,*

*wherein the locking switch includes a sliding member configured to be movable to interfere with the locking member when the locking member is inserted into the cabinet through the accommodation hole.*

*25. The door locking device according to claim 24, wherein the locking switch is provided so as not to protrude outside of the cabinet of the washing machine.*

*26. The door locking device according to claim 24, wherein the locking switch is provided so as not to be exposed to an outside of the cabinet of the washing machine.*

*27. The door locking device according to claim 24, wherein the sliding member is provided to be reciprocally movable in a front to back direction.*

*28. The door locking device according to claim 24, further comprising a door open/close detection sensor,*

*wherein the sliding member is provided to move based on a signal detected by the door open/close detection sensor.*

*29. The door locking device according to claim 24, wherein:*

*the locking switch is positioned rear of the locking member inserted into the cabinet of the washing machine, and*

*the sliding member is provided to slide forward toward the locking member inserted into the cabinet of the washing machine.*

*30. The door locking device according to claim 29, wherein the locking member is configured to accommodate an end of the sliding member.*

*31. The door locking device according to claim 24, wherein:*

*the second mounting unit includes a locking switch coupling part, and*

*the locking switch includes a mounting unit coupling part into which the locking switch coupling part is inserted.*

*32. The door locking device according to claim 24, wherein the second mounting unit includes a flip cover provided to open and close the accommodation hole.*

*33. The door locking device according to claim 32, wherein the flip cover includes:*

*a cover part to cover the accommodation hole;*

*a hinge shaft to rotate the cover part; and*

*a closing member provided to elastically bias the cover part.*

*34. The door locking device according to claim 32, further comprising a door open/close detection sensor,*

*wherein the flip cover is provided to open and close the accommodation hole in coordination with a signal detected by the door open/close detection sensor.*

*35. The door locking device according to claim 24, wherein:*

*the door is rotatably coupled to an upper portion of the frame, and*

*the locking member is formed to a lower portion of the door.*

* * * * *